(12) United States Patent
Holden

(10) Patent No.: US 6,421,182 B1
(45) Date of Patent: *Jul. 16, 2002

(54) APPARATUS FOR DISPLAYING AN IMAGE SUSPENDED IN SPACE

(75) Inventor: John Graham Holden, Hemel Hempstead (GB)

(73) Assignee: Central Research Laboratories, Limited, Hayes (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/647,889
(22) PCT Filed: Mar. 19, 1999
(86) PCT No.: PCT/GB99/00864
§ 371 (c)(1),
(2), (4) Date: Jan. 22, 2001
(87) PCT Pub. No.: WO99/53359
PCT Pub. Date: Oct. 21, 1999

(30) Foreign Application Priority Data

Apr. 9, 1998 (GB) ............................................. 9807767

(51) Int. Cl.[7] ........................ G02B 27/10; G02B 27/22; G02B 21/00
(52) U.S. Cl. ........................ 359/629; 359/477; 359/479; 353/10
(58) Field of Search .................................. 359/471, 477, 359/479, 629, 630, 633, 857; 353/10

(56) References Cited

U.S. PATENT DOCUMENTS 6,204,973 B1 * 3/2001 Holden ........................ 359/629

* cited by examiner

Primary Examiner—Georgia Epps
Assistant Examiner—David N. Spector
(74) Attorney, Agent, or Firm—William H. Bollman

(57) ABSTRACT

Apparatus for displaying an image suspended in space comprises an object (1) for display, a retroreflector (2) receiving light from the object, a beamsplitter (3) in a path for light from the object to the retroreflector, and a concave mirror (4) between the beamsplitter and the retroreflector. The beamsplitter makes an oblique angle to the direction (6) of propagation of the light such that it transmits some light. Light from the beamsplitter is reflected by the mirror to the retroreflector which reflects it back via the mirror to the beamsplitter. This retroreflected light is reflected by the beamsplitter to form a real image (5) suspended in space. The use of a concave mirror improves viewability over apparatus including a converging lens because unwanted reflections from the surfaces of the lens are eliminated.

8 Claims, 1 Drawing Sheet

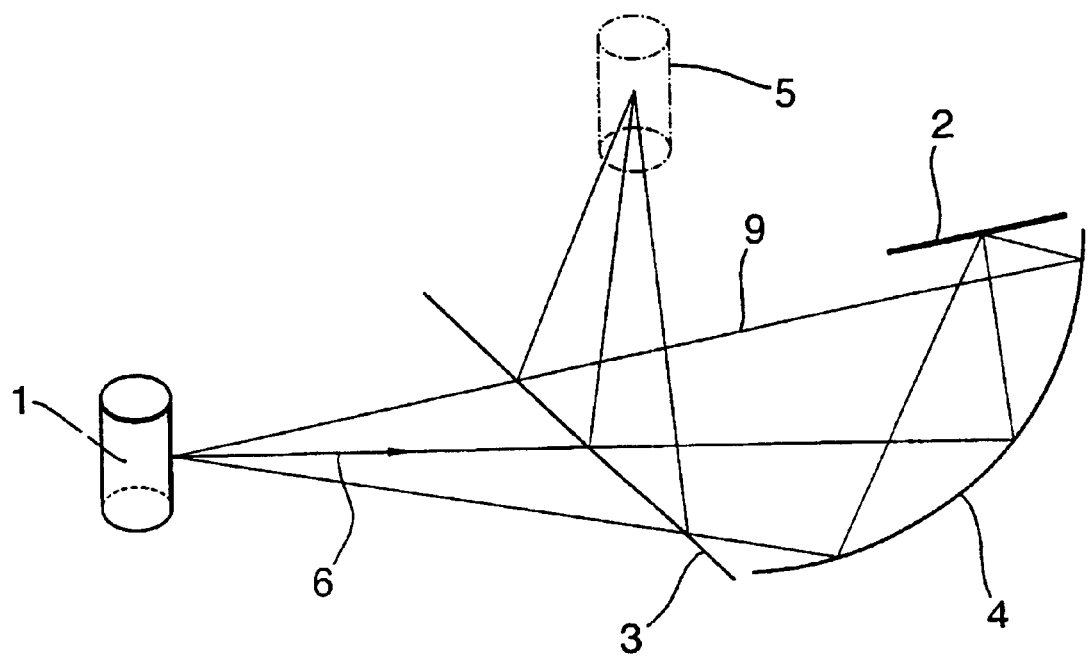

APPARATUS FOR DISPLAYING AN IMAGE SUSPENDED IN SPACE

BACKGROUND OF THE INVENTION

1. Field of the Invention

This invention relates to apparatus for displaying an image suspended in space, comprising: an object for display; a retroreflector being arranged to receive light from the object; a beamsplitter in a path for light from the object to the retroreflector, the beamsplitter being arranged at an oblique angle to the direction of propagation of the light such that it transmits part of the light and reflects part of the light, the light being either transmitted or reflected by the beamsplitter is received by the retroreflector and is reflected by it back to the beamsplitter, which either reflects or transmits part of this retroreflected light to form a real image suspended in space.

2. Background

A known display apparatus of this type is described in EP-A-0460873.

SUMMARY OF THE INVENTION

According to a first aspect of the present invention there is provided apparatus as defined in the first paragraph above, characterized in that the apparatus further comprises a concave mirror being arranged between the beamsplitter and the retroreflector such that light from the beamsplitter is reflected by the concave mirror to the retroreflector which reflects it back via the concave mirror towards the beamsplitter in use. The presence of a concave mirror between the beamsplitter and the retroreflector can improve viewability of the image by avoidance of reflections from the surfaces of one or more converging lenses.

BRIEF DESCRIPTION OF THE DRAWINGS

Features and advantages of the present invention will become apparent to those skilled in the art from the following description with reference to the drawings, in which:

FIG. 1 shows an apparatus according to the invention for displaying a real image suspended in space.

DETAILED DESCRIPTION OF ILLUSTRATIVE EMBODIMENTS

Embodiments of the invention will now be described, by way of example only, with reference to the accompanying diagrammatic drawings, in which:

FIG. 1 shows a side view of a first embodiment.

FIG. 1 shows an apparatus according to the invention for displaying a real image suspended in space. The apparatus comprises an object (1) for display; a retroreflector (2) being arranged to receive light from the object; a beamsplitter (3) in a path for light from the object to the retroreflector, the beamsplitter being arranged at an oblique angle to the direction of propagation (6) of the light such that it transmits part of the light (9), the light being transmitted by the beamsplitter is received by the retroreflector and is reflected by it back to the beamsplitter, which reflects part of this retroreflected light to form a real image (5) suspended in space. The apparatus further comprises a concave mirror (4) being arranged between the beamsplitter (3) and the retroreflector (2) such that light from the beamsplitter is reflected by the concave mirror onto the retroreflector, which reflects it back to the concave mirror and then back towards the beamsplitter.

In the present embodiment the object (1) comprises an illuminated object, although the object can comprise an image being displayed by a visual display unit. The retroreflector comprises a sheet of bead type retroreflective material. As an alternative, the retroreflective material may comprise a sheet of a corner cube retroreflecting material, or a triple mirror retroreflector, or other direction selective screen.

It will be realised by someone skilled in the art that the invention will also function for the case in which light initially reflected by the beamsplitter is reflected by a concave mirror placed between the beamsplitter and a retroreflector positioned so as to retroreflect light arriving from the concave mirror.

Likewise two concave mirrors and two retroreflectors may be used such that one concave mirror and retroreflector combination receives light from the object initially transmitted by the beamsplitter and the other concave mirror and retroreflector combination receives light from the object which is initially reflected by the beamsplitter. No alignment of the suspended images subsequently produced by each of the retroreflectors will be required since the retroreflectors will, by definition, return the light to the same locations. In this case the brightness of the suspended image subsequently produced will be increased by a factor of two.

It is believed that the reason that the presence of a converging optical element such as the concave mirror is so advantageous is that contrary to simple theory a ray of light incident on a retroreflector will not be returned precisely along the direction from which it came because of diffraction effects, manufacturing tolerances, translational shifts, or other causes of imperfect retroreflection. As a result the incident ray becomes a narrow cone of light after retroreflection. If one places a converging optical element in the path of this cone of light it will behave as if it had originated at a point source, and the lens will bring the cone of light to a focus. If the concave mirror is positioned such that it forms an image of the object at the surface of the retroreflector, then the point at which the same mirror will form an image of the point source from the cone of retroreflected light will coincide with the position of the original object, or where a beamsplitter diverts the light at the position of the suspended image. The result of the presence of the concave mirror is a dramatic sharpening of the suspended image. The improvement is such that bead retroreflectors (which do not retroreflect perfectly and so usually give rise to poor quality suspended images) can be used to form suspended images showing resolutions of TV quality.

In addition, because light from the object is being focused onto the retroreflecting material a reduced area of retroreflector sheet is required. Hence smaller (cheaper) systems can be produced for a given viewing angle, or a greater viewing angle can be achieved with a given retroreflector area. Larger "seamless" images may be produced from a single retroreflective "tile" of a given size.

The apparatus is preferably arranged such that the distance between the retroreflector and the concave mirror is selectable, or variable in use.

What is claimed is:

1. Apparatus for displaying an image suspended in space, comprising: an object for display; a retroreflector being arranged to receive light from the object; a beamsplitter in a path for light from the object to the retroreflector, the beamsplitter being arranged at an oblique angle to the direction of propagation of the light such that it transmits part of the light and reflects part of the light, the light being transmitted or reflected by the beamsplitter is received by the retroreflector and is reflected by it back to the beamsplitter, which either reflects or transmits part of this retroreflected light, to form a real image suspended in space, characterised by the apparatus further comprising a concave mirror being arranged between the beamsplitter and the retroreflector such that light from the beamsplitter is reflected by the concave mirror to the retroreflector which reflects it back via the concave mirror towards the beamsplitter in use.

2. Apparatus as claimed in claim 1 in which the concave mirror is located such that it forms an image of the given object or image at the retroreflector.

3. Apparatus as claimed in claim 1 in which a first retroreflector is provided to receive light being transmitted by the beamsplitter from the object and a further retroreflector is provided to receive light being reflected by the beamsplitter from the object, such that part of the light being reflected by both retroreflectors forms the real image suspended in space, a first and a further concave mirror being provided in the respective paths of light from the beamsplitter to said retroreflectors.

4. Apparatus as claimed in claim 1 in which the retroreflector is a bead retroreflector.

5. Apparatus as claimed in claim 1 in which the retroreflector is a triple mirror retroreflector.

6. Apparatus as claimed in claim 1 in which the retroreflector is a corner-cube retroreflector.

7. Apparatus as claimed in claim 1 in which the beamsplitter makes an angle of between 35 and 55 degrees to the direction of propagation of light from the object to the retroreflector.

8. Apparatus as claimed in claim 1 in which the distance between the concave mirror and the retroreflector is selectable.

* * * * *